US006921118B2

(12) United States Patent
Clark et al.

(10) Patent No.: US 6,921,118 B2
(45) Date of Patent: Jul. 26, 2005

(54) SLIDING AND NESTING CONSOLE SYSTEM

(75) Inventors: Kenneth M. Clark, Howell, MI (US);
Adam W. Callif, Holland, MI (US);
Giovanni Shin, Holland, MI (US);
John C. Ickes, Holland, MI (US);
Michael M. Warsaw, Holland, MI (US); John Brett, Holland, MI (US);
Craig D. Flowerday, Holland, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 10/310,715

(22) Filed: Dec. 5, 2002

(65) Prior Publication Data

US 2003/0197392 A1 Oct. 23, 2003

(30) Foreign Application Priority Data

Apr. 22, 2002 (US) ................................ PCT/US02/12562

(51) Int. Cl.⁷ ................................................. B60R 7/04
(52) U.S. Cl. ................................ 296/24.34; 296/24.46; 296/37.8; 296/37.14
(58) Field of Search .......................... 296/24.1, 193.02, 296/37.1, 37.8, 37.12, 37.14, 70, 74, 24.3, 24.34, 24.46, 1.09, 1.07

(56) References Cited

U.S. PATENT DOCUMENTS

| 1,306,498 A | 6/1919 | Moses |
| 1,674,340 A | 6/1928 | Nock |

(Continued)

FOREIGN PATENT DOCUMENTS

| DE | 23 59 718 A1 | 11/1973 |
| DE | 31 51 298 A1 | 12/1981 |
| DE | G 86 18 079.7 | 7/1986 |
| DE | 690 03 767 T2 | 7/1990 |
| DE | 41 16 758 C2 | 5/1991 |
| DE | 44 38 623 A1 | 10/1994 |
| DE | 195 29 876 A1 | 2/1997 |
| DE | 198 22 638 A1 | 12/1999 |
| DE | 098 56 979 A1 | 3/2000 |
| DE | 199 09 732 A1 | 9/2000 |
| DE | 201 03 563 U1 | 2/2001 |
| DE | 298 08 950 U1 | 8/2001 |

(Continued)

OTHER PUBLICATIONS

Patent Abstract of Japan Publication No. 57–158140, Nissan Motor Co Ltd., Sep. 29, 1982, 2 pages.
Prince Corporation, "Reposition Features," O–ZONE Project, bearing an indication of "May 5, 1996–Nov. 1, 1996," (7 Pages).
"Power Spine®," O–ZONE, bearing an indication of "© 1996 Prince Corporation, Jul. 23, 1996" (2 Pages).
"Innovation in the most pleasing form!," *Automotive & Transportation Interiors*, a Publication of Shore–Varrone, Inc., Nov. 1998 (2 Pages).
Johnson Controls Design, Concept Sketch, 1994 (1 Page).

*Primary Examiner*—Patricia L. Engle
(74) *Attorney, Agent, or Firm*—Foley & Lardner LLP

(57) ABSTRACT

A console system which may translate longitudinally in a vehicle includes a forward end which is capable of being at least partially nested with a vehicle instrument panel. The range of movement may extend to the front seats or further toward the rear of the vehicle to provide functionality for occupants of second or even third row seats. The translation mechanism preferably includes a track similar to those employed in the vehicle art for manual seat adjustment. In the most preferred embodiment, a storage drawer is included in the instrument panel which may be used when the console is in any position, including its nested position.

34 Claims, 7 Drawing Sheets

U.S. PATENT DOCUMENTS

| | | | |
|---|---|---|---|
| 2,120,619 A | 6/1938 | Matthiesen | |
| 2,929,539 A | 3/1960 | Safreno | |
| 3,356,409 A | 12/1967 | Belsky et al. | |
| 3,451,035 A | 6/1969 | Baldwin | |
| 3,474,381 A | 10/1969 | Baldwin | |
| 3,984,161 A | 10/1976 | Johnson | |
| 4,173,382 A | 11/1979 | Booty | |
| 4,182,532 A | 1/1980 | Walker, Sr. | |
| 4,469,365 A | 9/1984 | Marcus et al. | |
| 4,598,948 A | 7/1986 | Flowerday | |
| 4,685,729 A | 8/1987 | Heesch et al. | |
| 4,738,481 A | 4/1988 | Watjer et al. | |
| 4,809,897 A | 3/1989 | Wright, Jr. | |
| 4,818,017 A | 4/1989 | Dykstra et al. | |
| 4,867,498 A | 9/1989 | Delphia et al. | |
| 4,887,196 A | 12/1989 | Brown et al. | |
| 4,974,129 A | 11/1990 | Grieb et al. | |
| 4,998,770 A | 3/1991 | Shimizu et al. | |
| 5,040,990 A | 8/1991 | Suman et al. | |
| 5,067,625 A | 11/1991 | Numata | |
| 5,076,641 A | 12/1991 | Lindberg | |
| 5,077,643 A | 12/1991 | Leach | |
| 5,085,481 A | 2/1992 | Fluharty et al. | |
| 5,113,318 A | 5/1992 | Conley | |
| 5,128,847 A | 7/1992 | Lin et al. | |
| 5,154,617 A | 10/1992 | Suman et al. | |
| 5,180,089 A | 1/1993 | Suman et al. | |
| RE34,333 E | 8/1993 | Boerema et al. | |
| 5,285,941 A | 2/1994 | Herrera | |
| 5,303,970 A | 4/1994 | Young et al. | |
| 5,338,081 A | 8/1994 | Young et al. | |
| 5,397,160 A | 3/1995 | Landry | |
| 5,433,509 A | 7/1995 | Hotary et al. | |
| D361,972 S | 9/1995 | Ney et al. | |
| 5,562,331 A | 10/1996 | Spykerman et al. | |
| 5,599,086 A | 2/1997 | Dutta | |
| 5,611,589 A | 3/1997 | Fujii et al. | |
| 5,810,434 A | 9/1998 | Thompson et al. | |
| 5,820,197 A | 10/1998 | Lanser | |
| 5,823,599 A | 10/1998 | Gray | |
| 5,845,965 A | 12/1998 | Heath et al. | |
| 5,863,089 A | 1/1999 | Ignarra et al. | |
| 5,893,603 A | 4/1999 | Viertel et al. | |
| 5,897,155 A | 4/1999 | Kerner et al. | |
| 5,927,784 A | 7/1999 | Vitito | |
| 5,951,084 A | 9/1999 | Okazaki et al. | |
| 5,954,252 A | 9/1999 | Gebresclassic et al. | |
| 6,003,927 A | 12/1999 | Korber et al. | |
| 6,019,411 A | 2/2000 | Carter et al. | |
| 6,045,173 A | 4/2000 | Tiesler et al. | |
| 6,062,623 A | 5/2000 | Lemmen | |
| 6,086,129 A | 7/2000 | Gray | |
| 6,092,704 A | 7/2000 | Baumeister | |
| 6,116,674 A | 9/2000 | Allison et al. | |
| 6,135,529 A | 10/2000 | De Angelis et al. | |
| 6,152,522 A | 11/2000 | Boulay et al. | |
| 6,158,639 A | 12/2000 | De Silva et al. | |
| 6,158,795 A | 12/2000 | Gray et al. | |
| 6,174,019 B1 | 1/2001 | Collet et al. | |
| 6,176,536 B1 | 1/2001 | Miller et al. | |
| 6,203,088 B1 | 3/2001 | Fernandez et al. | |
| 6,234,570 B1 | 5/2001 | Quinno et al. | |
| 6,250,729 B1 | 6/2001 | Allison et al. | |
| 6,264,261 B1 | 7/2001 | Krafcik | |
| 6,267,428 B1 | 7/2001 | Baldas et al. | |
| 6,293,616 B1 | 9/2001 | Williams et al. | |
| 6,321,960 B1 | 11/2001 | Ellis et al. | |
| 6,338,517 B1 | 1/2002 | Canni et al. | |
| 6,367,857 B2 * | 4/2002 | Kifer et al. | 296/24.1 |
| 6,419,314 B1 | 7/2002 | Scheerhorn | |
| 6,428,072 B1 | 8/2002 | Moore | |
| 6,435,587 B1 | 8/2002 | Flowerday et al. | |
| 6,644,526 B2 | 11/2003 | Pegorier | |
| 6,726,267 B2 | 4/2004 | Kim et al. | |
| 6,752,444 B2 | 6/2004 | Kitano et al. | |
| 2001/0030436 A1 | 10/2001 | Kifer et al. | |
| 2001/0030440 A1 | 10/2001 | Ney | |
| 2002/0163219 A1 | 11/2002 | Clark et al. | |
| 2003/0067183 A1 | 4/2003 | Moore | |
| 2003/0107228 A1 | 6/2003 | Ono et al. | |
| 2003/0197392 A1 | 10/2003 | Clark et al. | |
| 2003/0234550 A1 * | 12/2003 | Brooks et al. | 296/24.1 |

FOREIGN PATENT DOCUMENTS

| | | |
|---|---|---|
| EP | 0 178 196 B1 | 4/1986 |
| EP | 0 189 051 B1 | 5/1989 |
| EP | 0 342 345 B1 | 11/1989 |
| EP | 0 795 437 A2 | 9/1997 |
| EP | 1 092 590 A1 | 4/2001 |
| JP | 57-167838 | 10/1982 |
| JP | 61-150237 | 9/1986 |
| JP | 62-194953 | 8/1987 |
| JP | 62-194955 | 8/1987 |
| JP | 9-58359 | 3/1997 |
| JP | 9-58360 | 3/1997 |
| JP | 9-58361 | 3/1997 |
| JP | 11-129827 | 5/1999 |
| JP | 2000-103290 | 4/2000 |
| JP | 2000-325181 | 11/2000 |
| JP | 2001-55091 | 2/2001 |
| WO | WO 99/48724 | 9/1999 |

* cited by examiner

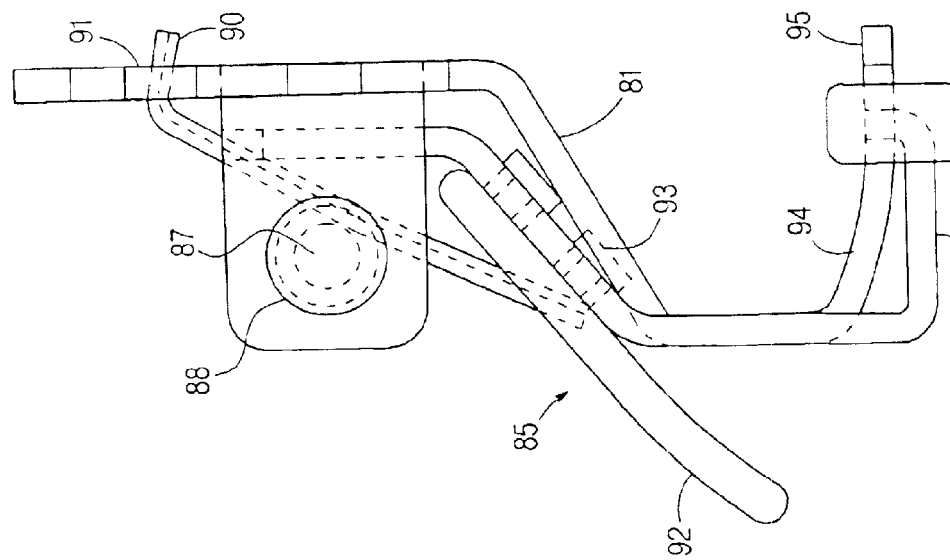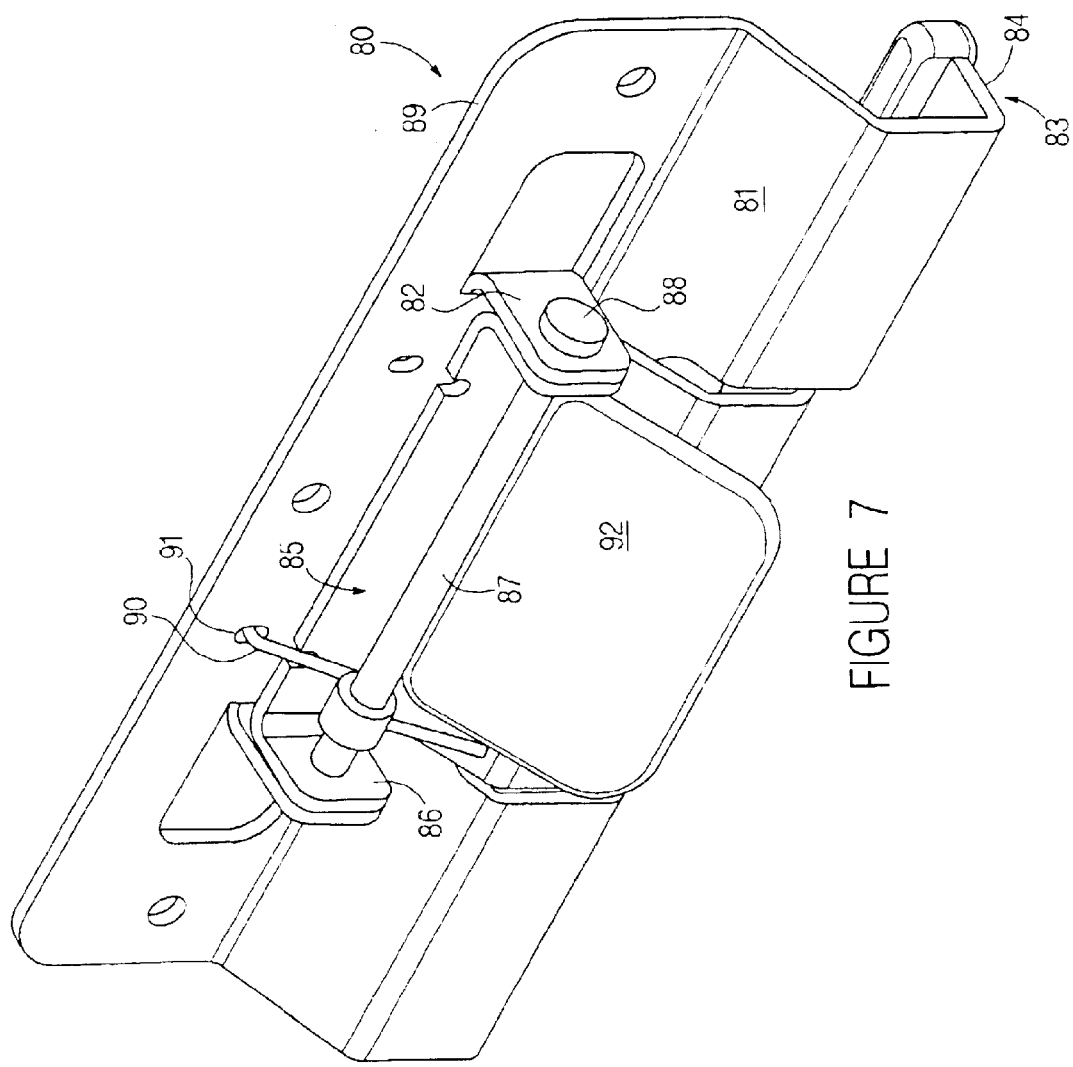

SLIDING AND NESTING CONSOLE SYSTEM

This Application claims priority under 35 U.S.C. § 119 to PCT Application No. PCT/US02/12562, filed Apr. 22, 2002 and titled "Article Attachment System."

BACKGROUND OF THE INVENTION

1. Field of the Invention

The present invention relates generally to the art of storage and holding systems for vehicles, and more particular, to console systems. In the most preferred embodiment of the present invention, a console is translatable in the fore and aft directions, using a track mechanism similar to one used for vehicle seating. The console may extend rearwardly so that the functions performed by it can be enjoyed by second and/or third row occupants. The present invention, in its most preferred form, also relates to the nesting of at least a portion of the console under or against at least a portion of the instrument panel.

2. Description of the Relevant Art

The use of console systems in vehicles has been known for many years. In many systems, the consoles are fixed in a single location and may include instruments, gauges, storage compartments, cup holders, as well as functional devices such as the gear shift lever, the parking brake actuator, side window adjusters, etc. It is also known that a variety of lids or covers may be used with consoles to conceal items such as coins, CD's, tapes, and other personal items used by the driver or vehicle occupants. Covers for such compartments are usually pivoted along one edge so that they may be opened to provide access and closed to provide either an armrest or other functionality. It is also known that storage devices may be located in instrument panels, including, for example, cigarette ashtrays, cup or can holders, etc.

In U.S. Pat. No. 6,203,088 issued Mar. 20, 2001, to Fernandez et al., and entitled "Sliding Console System", a system is described which includes a track to provide longitudinal movement for a console body within a vehicle. The illustrated embodiment also shows multiple console bodies which can each be adjusted independently of one another. The consoles may have power provided by an electric cable or sliding contact with the track so that one or more electrical devices can be contained in the consoles. The electrical functionality includes such features as controls for entertainment systems, climate control, seat adjustment, mirror adjustment, vehicle lighting, rear window defroster switches, as well as for use of such devices as radios, telephones, or computer power ports. The disclosure of the patent indicates that the console functionality may be used by the rear row seat occupants, as well as by the front row occupants, however, there is no suggestion in the patent of having any portion of the console engage, nest, or in any other way, contact the vehicle instrument panel.

Another system involving fore and aft movement of a vehicle component is shown in U.S. Published Patent Application 2001/0030440 A1, published Oct. 18, 2001. The "Vehicle Seat Assembly" includes a fixed center console between the front seats and a translatable center seat which moves from a rearward position in which it is aligned with the second row seats to a forward position in which it is located more closely to the front seats. In the preferred embodiment of this patent, the center seat includes a child safety seat mounted thereon.

A variety of other translatable console systems are known in the art. For example, Belsky et al. in U.S. Pat. No. 3,356,409 issued Dec. 5, 1967 for "Sliding Console" discloses a console that rides along the top of a raised floor portion and can be moved fore and aft. The device disclosed in this patent also includes an air passage to assist in moving air from in front of the console to the vehicle environment behind it.

A console box that can move forwardly and rearwardly is disclosed in U.S. Pat. No. 5,951,084 issued to Okozaki et al. on Sep. 14, 1999 for "Seat Structure for a Vehicle." The console forms a portion of a rear seat and includes a cavity and a portion which folds down to form an armrest. A carriage including rollers facilitates console movement.

Another console which includes a translatable portion is disclosed in U.S. Pat. No. 4,685,729, issued to Heesch on Aug. 11, 1987 for "Retractable Console for an Automotive Vehicle". In this device, a screw drive moves the portion so that the device can function as a passenger seat or a storage console.

Boulay et al. in U.S. Pat. No. 6,152,522 issued on Nov. 28, 2000 for "Vehicle" shows and describes a console which may be placed in various longitudinal locations on a ventilation shaft extending down the center axis of a vehicle. In addition to providing center console functionality of the type described above, the console assists in controlling cockpit air conditioning.

Krafeik in U.S. Pat. No. 6,264,261, issued Jul. 24, 2001 for "Vehicle Console" discloses a fore and aft translatable dual purpose console. When opened, anchorage rods for securing child seats are presented for use. The area beneath the open top can hold a variety of articles.

DeAngelis et al., in U.S. Pat. No. 6,135,529 issued Oct. 24, 200 for "Multi-Position Sliding Center Console", shows a carriage mounted console that can be moved fore and aft from between a front row of seats to a rearward location. A track extending below the console includes slots, and the console is moved or locked into position by manipulation of a latch.

Yet another sliding console is shown in Japanese Patent No. 62-194953. This device is similar to some of the aforementioned consoles and allows for the console to slide under the front instrument panel by fixing a guide rail between the cabin front and a position between the seats. In addition, the gear shift lever is separately slidable along the same rails to allow optimum functioning at the side of the front seat, while maintaining a compact construction when the shift lever and the console are stored, one within the other.

While the general concept of console movement is addressed in the above patent art, generally ignored is the area between the front of the front seats and the instrument panel. There are occasions when certain console functionality may not be desired.

For example, it may be desirable to not have a console located between any row of seats but to have the console available for use when desired. In addition, it may be desirable to have the console translate forwardly, so that at least a portion thereof nests with the instrument panel, thereby freeing the area between the front of seats. A console system which provides these and various other capabilities would result in a substantial advance in this art.

FEATURES AND SUMMARY OF THE INVENTION

A primary feature of the present invention is to provide a console system for a vehicle, at least a portion of which at least partially nests with the vehicle instrument panel.

Another feature of the present invention is to provide a console system for a vehicle which is translatable along a track which includes track components similar to those used for the fore and aft position adjustment of vehicle seats.

A different feature of the present invention is to provide a storage drawer on the instrument panel which works independently of and in combination with the storage functionality of the console.

Yet another feature of the present invention is to provide a console system which includes a track which extends from the general area of the instrument panel to a rearward location in the vehicle.

A different feature of the present invention is to provide power to the console system.

How these and other features of the invention are accomplished individually, collectively, or in various subcombinations, will become apparent to those skilled in the art after they have read the following description of the preferred and alternate embodiments, taken in conjunction with the FIGURES. Generally, however, they are provided in a console system which includes a track mounted to the vehicle floor and a console body mounted thereon and engagable therewith using, e.g. track mechanisms such as those used in vehicle seating for fore and aft movement of the seats. By using a mechanism to release latches, pins, detents, teeth, and the like, the console may be moved between fore and aft positions at the discretion of vehicle occupants. In the most preferred form of the invention, the console includes a portion which nests with a similarly configured portion of the instrument panel, to place the console forwardly of the front seats of the vehicle, thereby creating an unobstructed area between the two front seats. In such an arrangement, and in the preferred and illustrated embodiment, a storage drawer is provided in the instrument panel which may be opened or closed independently of the location of the console. In one configuration, the console is located in a position between the front seats to present storage or holding features for such items as keys, coins, cups, and the like, with the drawer being closed. By movement of the console to a more rearward position, both the holding and storage functions of the drawer and the console can be fully utilized. In the most preferred form of the invention, the track extends rearwardly to provide access to the console for occupants in the second or third row seats, depending on the type of vehicle. Power may be provided to various console components for the same purposes described in the aforementioned art. Other ways in which the features of the present invention are accomplished will appear to those skilled in the art after they have read the specification, and such other ways are deemed to fall within the scope of the present invention if they fall within the scope of the claims which follow.

BRIEF DESCRIPTION OF THE DRAWINGS

FIG. 7 is a perspective view of one latching arrangement used in the preferred embodiment to lock the console to the track of FIG. 6; and FIG. 8 is a side view, partially in section, showing further details of the locking mechanism.

In the various drawings, like reference numerals are used to indicate like components.

DETAILED DESCRIPTION OF THE PREFERRED AND ALTERNATE EMBODIMENTS

Before proceeding to the detailed description of the preferred and alternate embodiments of the present invention, several general comments can be made about the applicability and the scope thereof.

First, while one particular nesting configuration is shown, i.e. arcuate segments formed on the forward portion of the console and in the instrument panel, any other geometric configuration can be used for either of the components, so long as at least a portion of the sliding console nests (touches and mates with) the surface of at least a portion of the instrument panel.

Second, the materials useful for constructing the console and the instrument panel can be selected from any of those already known in the vehicle art. For example, the materials can be vinyl, leather, metal, cloth, plastic, and the like.

Figure 6:
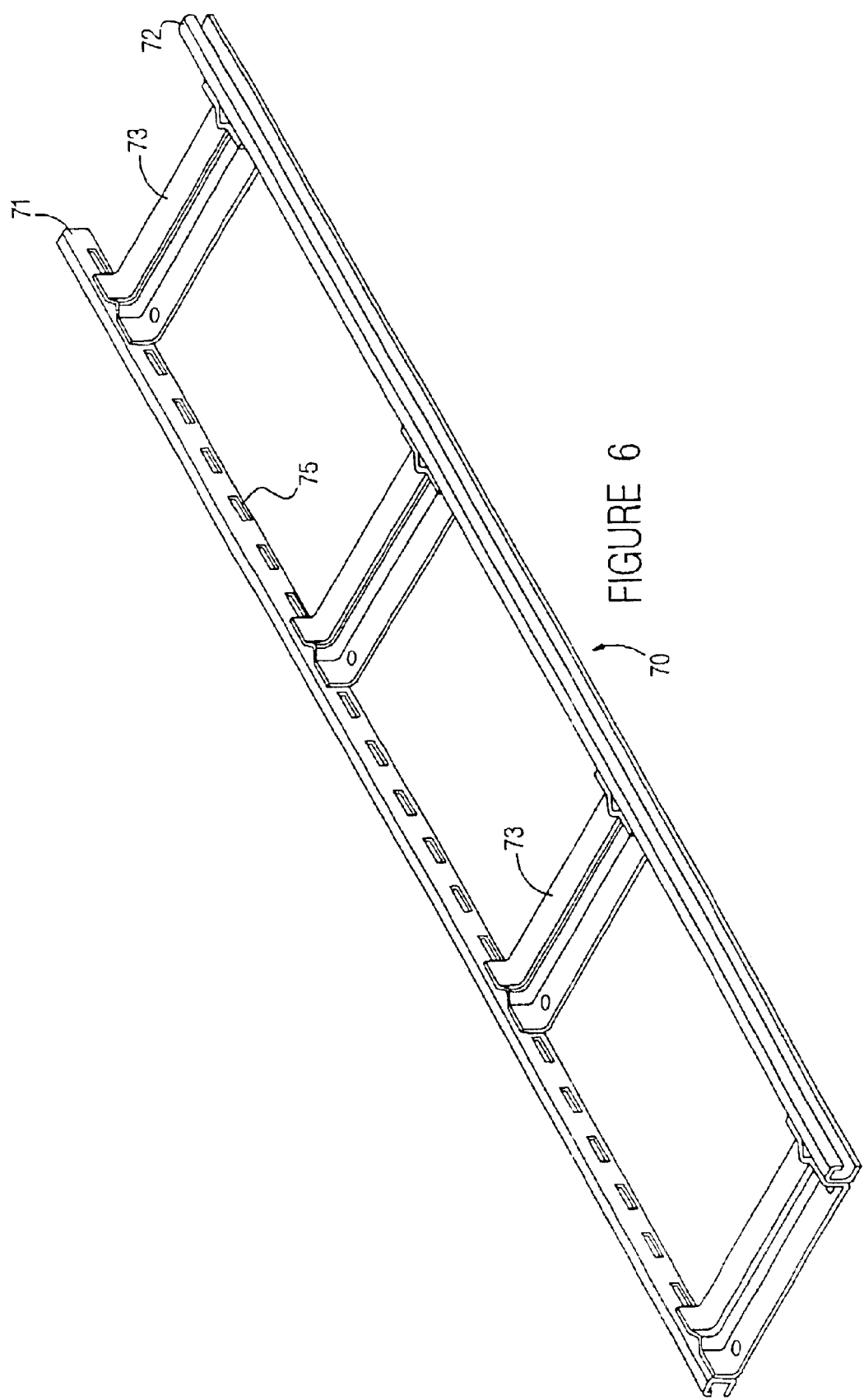
FIG. 6 is a perspective view of a track for use with a sliding and nesting console of the present invention.

Third, one representative track mechanism is illustrated in FIGS. 6–8, but any other track mechanism already known for vehicle use, for example those used for manual seat adjustment, can be substituted for the track and locking mechanism shown in these FIGURES. It is desirable that the track mechanism operate smoothly, that the console be locked securely thereto to avoid separation of the console in the event of a sudden braking or an impact situation, and for aesthetic and cleanliness purposes, that the track be attractive, easily cleanable, etc. A cover can be applied between track elements to cover the stringers which separate them.

Fourth, the length of the tracks can also be varied widely. In order to nest, the tracks must extend forwardly to a position which will allow the console to at least partially nest with the instrument panel when the console is in its forward most position on the track. With regard to the length of the tracks, the tracks can extend to a position which allows the console to be placed between the front seats, or it can be extended considerably further to allow the console to slide rearwardly to a location between the first and second row seats, between the second row seats, or even to a position where it can be used by third row seat occupants in minivans, SUVs, and the like.

Fifth, while two consoles are shown in one FIGURE, and one is described as the preferred embodiment, the number of consoles can vary, as can the content, styling, and functionality thereof. The sliding console used in the present invention, the forward one of which nests at least partially with the instrument panel, can include lids, push-push container holders, cavities, trays, can or cup holders, electrical ports for connection of cellular telephones, computers, ports for connection of infotainment devices, such as DVD players, gear shift, and brake components, lights, etc. The invention is not to be limited to any particular functionality for the console, the number of consoles or any particular relationship between consoles if more than one is employed.

As shown in one FIGURE, two consoles can abut one another, but they may, in fact, be arranged to nest, one within the other, etc. In connection with the latter, reference should be had to the aforementioned Fernandez et al., U.S. Pat. No. 6,203,088.

Sixth, one feature of the preferred embodiment of the invention is to employ a relatively deep drawer in the instrument panel located above the area where the console nests. In the particular illustrated embodiment, the drawer is deep enough to hold beverage cups, cans, and the like and includes electrical ports, such as those used for cigarette lighters, the connection of cellular telephone charging devices, etc. The principles of the present invention are applicable to the nesting of a console with instrument panels which do not include any drawers, or to instrument panels with more than a single drawer. Other functional devices can be located in the area immediately above the nesting area, such as rotatable cup holders, cup holders which are extended using a push-push mechanism, controls, gauges, and the like.

Figure 1:
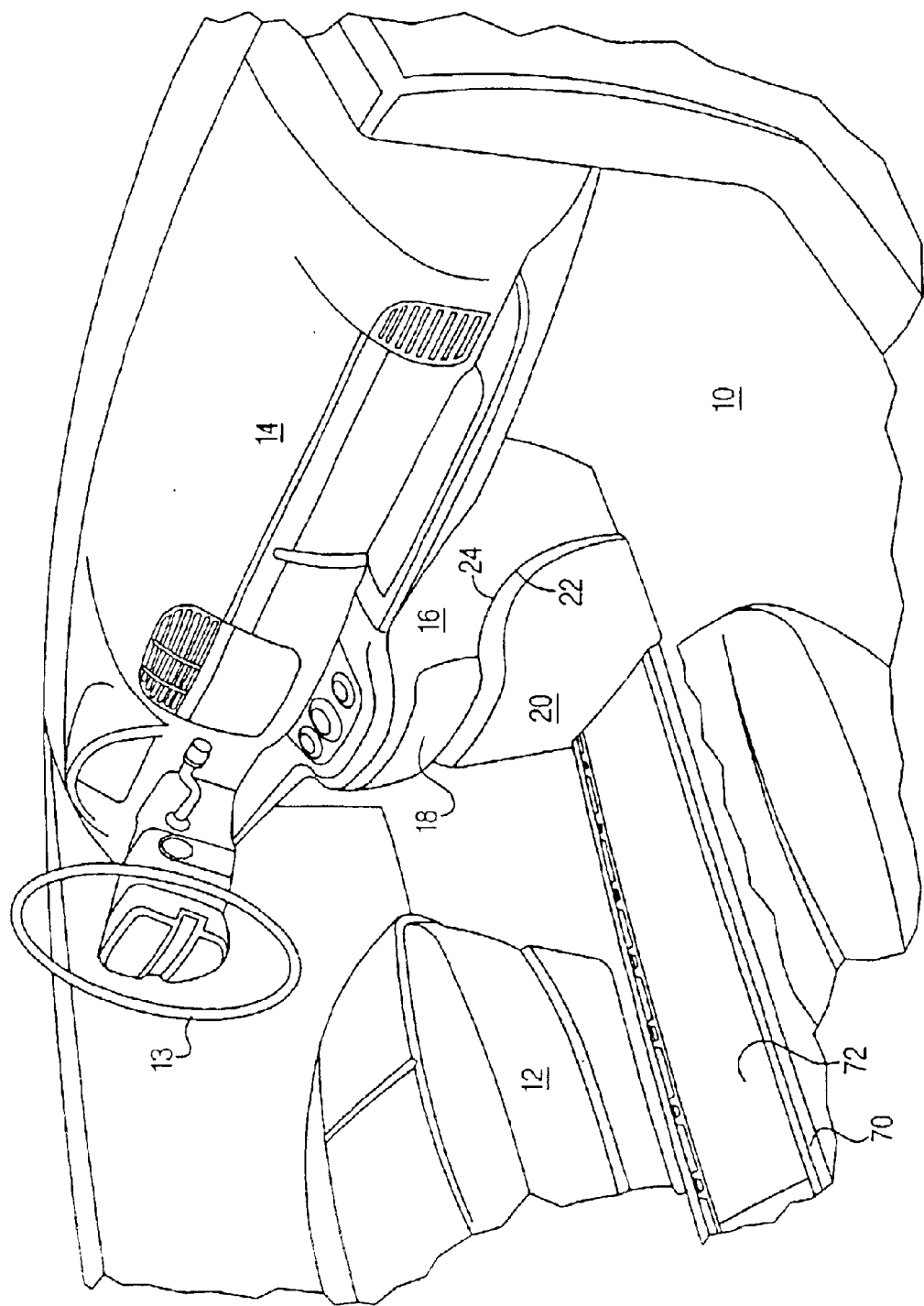
FIG. 1 is a perspective view showing the nesting console of the preferred embodiment of the present invention.

Proceeding now to the description of the most preferred embodiment, a perspective view of the front portion of a vehicle cockpit 10 is shown in FIG. 1. The driver's seat 12 and steering wheel 13 are shown schematically, as are other components, and many components such as roof and windshield structures are not shown at all for purposes of facilitating an explanation of the devices which form part of the present invention.

Instrument panel 14 is shown to include a lower portion 16 having a drawer 18 formed therein. In the preferred embodiment, lower portion 16 is located along the mid-line of cockpit 10 so that it may be accessed by either the driver or by a passenger occupying the other front seat (not shown). More will be said about the drawer 18 later in this description.

Located beneath portion 16 of instrument panel 14 is a center console 20. It too will be described in greater detail later, but the important feature to be noted in FIG. 1 is the surface 22 of console 20 which is generally arcuate and convex. It is adapted to nest against an arcuate and concave portion 24 of lower portion 16 of instrument panel 14. As indicated above, the particular shapes are not as important to the scope of the invention as is the fact that at least one portion of the console 20 nests with at least one portion of the instrument panel 14, e.g., the illustrated lower portion 16 thereof. The term "instrument panel" as used herein is not to be taken as a limiting term with respect to its height, functionality or whether it includes a lower portion which extends all the way to the floor as shown in FIG. 1 and in other FIGURES. Generally, the instrument panel is located in front of the first row of seats and contains one or more of the following: an instrument cluster, air ducts and vents, drawers, cup or can holders, air bag modules, switches, radio, CD or other infotainment components, one or more glove or map compartment, padding, impact countermeasures or other devices generally known in the vehicle field for inclusion at this location.

Another aspect of the present invention is shown in FIG. 1 and later FIGURES, i.e., a track 70 described in detail in connection with FIG. 6. A cover 72 fits between the two elongate track elements to cover stringers holding the track elements apart and securing the track 70 to the floor of the vehicle. For the present, it is only necessary to understand that console 20 may be moved longitudinally with respect to cockpit 10 at the discretion of the driver or a passenger.

Figure 2:
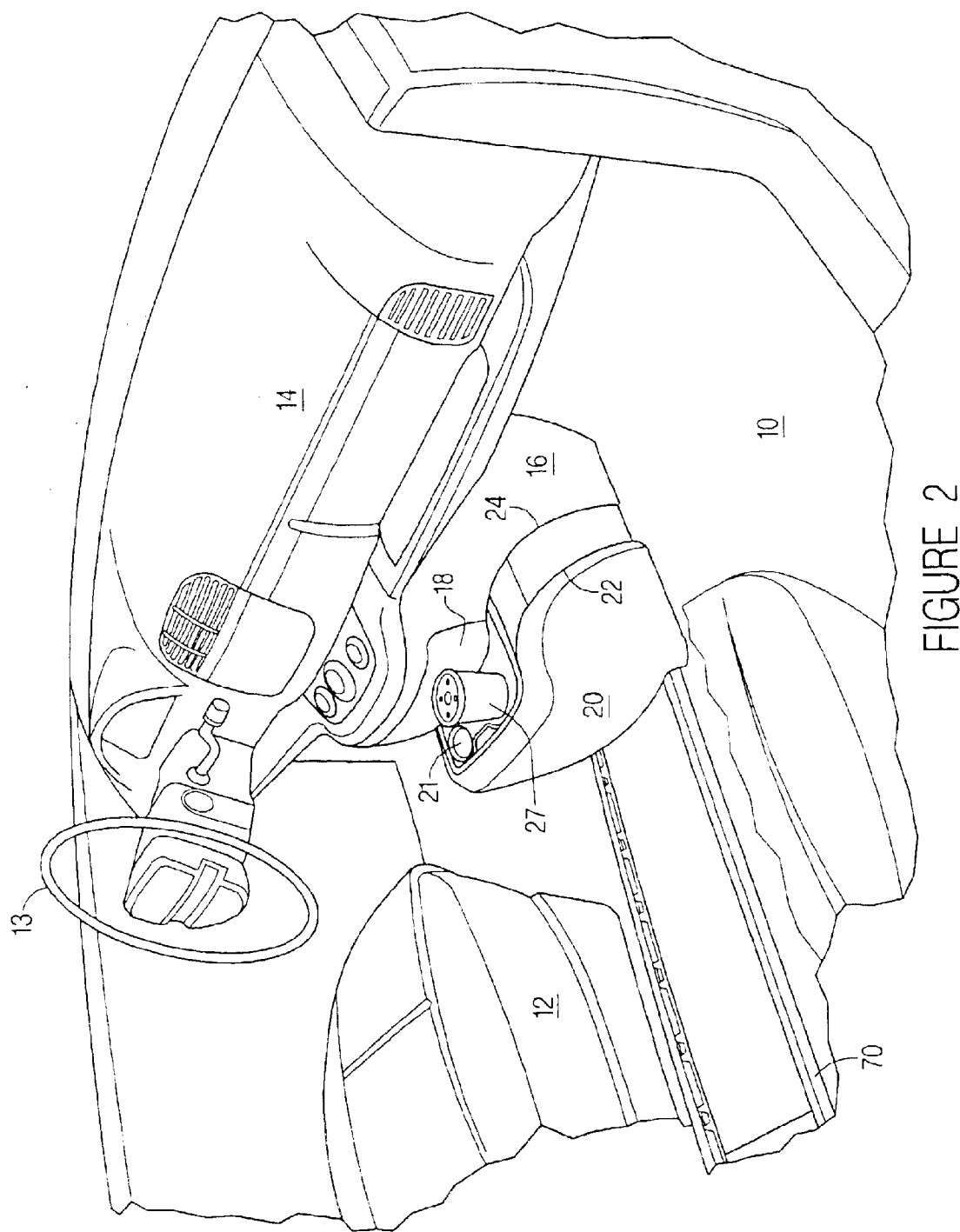
FIG. 2 is a perspective view, similar to that of FIG. 1, but showing the console moved rearwardly to provide access to a cupholder contained therein.

FIG. 2 illustrates such movement. In this instance, console 20 is displaced a small distance from portion 16. The distance is sufficient to expose two cup holders 21, one of which holds a cup 27. The particular shape, depth, and arrangement of the upper surface of console 20 is not critical to the present invention. For example, cup holders could be eliminated entirely or provided together with a coin holder or tray, electrical, or telecommunication ports, sliding lids to give access to the inside of console 20 (for example to access tapes, CDs, DVDs, or the like). In and of themselves, the particular construction of the body of console 20 or its materials or manner of construction do not form part of the present invention, and once the nesting and displacement and locking features are understood, details about the console 20 itself need not be described here.

Figure 3:
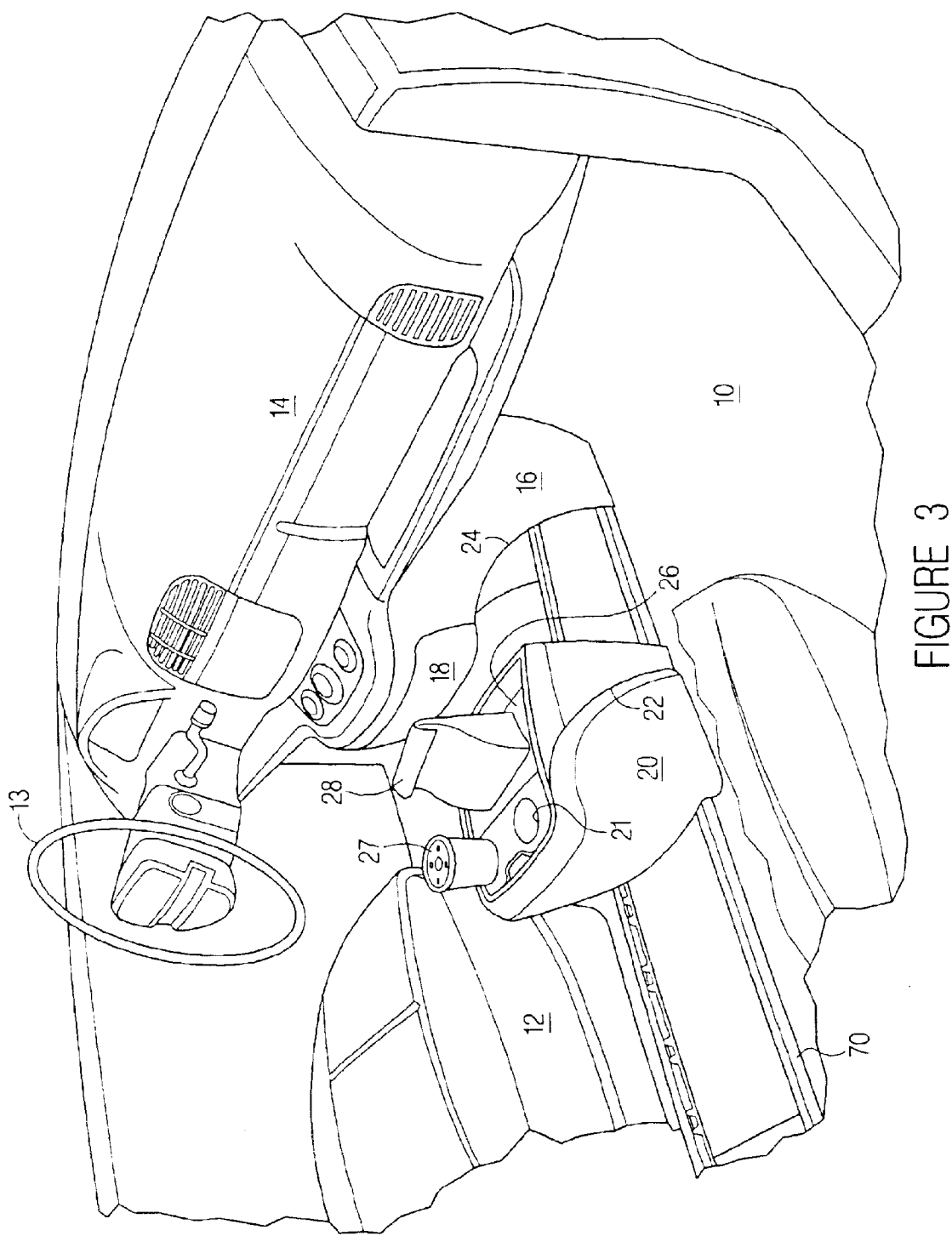
FIG. 3 is another perspective view, similar to FIGS. 1 and 2, with the console moved further from the instrument panel to allow article storage as well as the holding of a cup.

Another configuration of the sliding console system of the present invention is shown in FIG. 3. Here, console 20 has been displaced further toward the rear of cockpit 10. A tray 26 is shown forwardly of the cup holders 21, and a lunch bag 28 is shown on tray 26. All the comments of the paragraph immediately above are incorporated here with respect to the shape, construction and functionality of console 20. Also, as to color, the illustrated console 20 is shown to have two tones, but again this is a design choice and a single tone or multiple tones can be used for both the instrument panel 14 and console 20.

Figure 4:
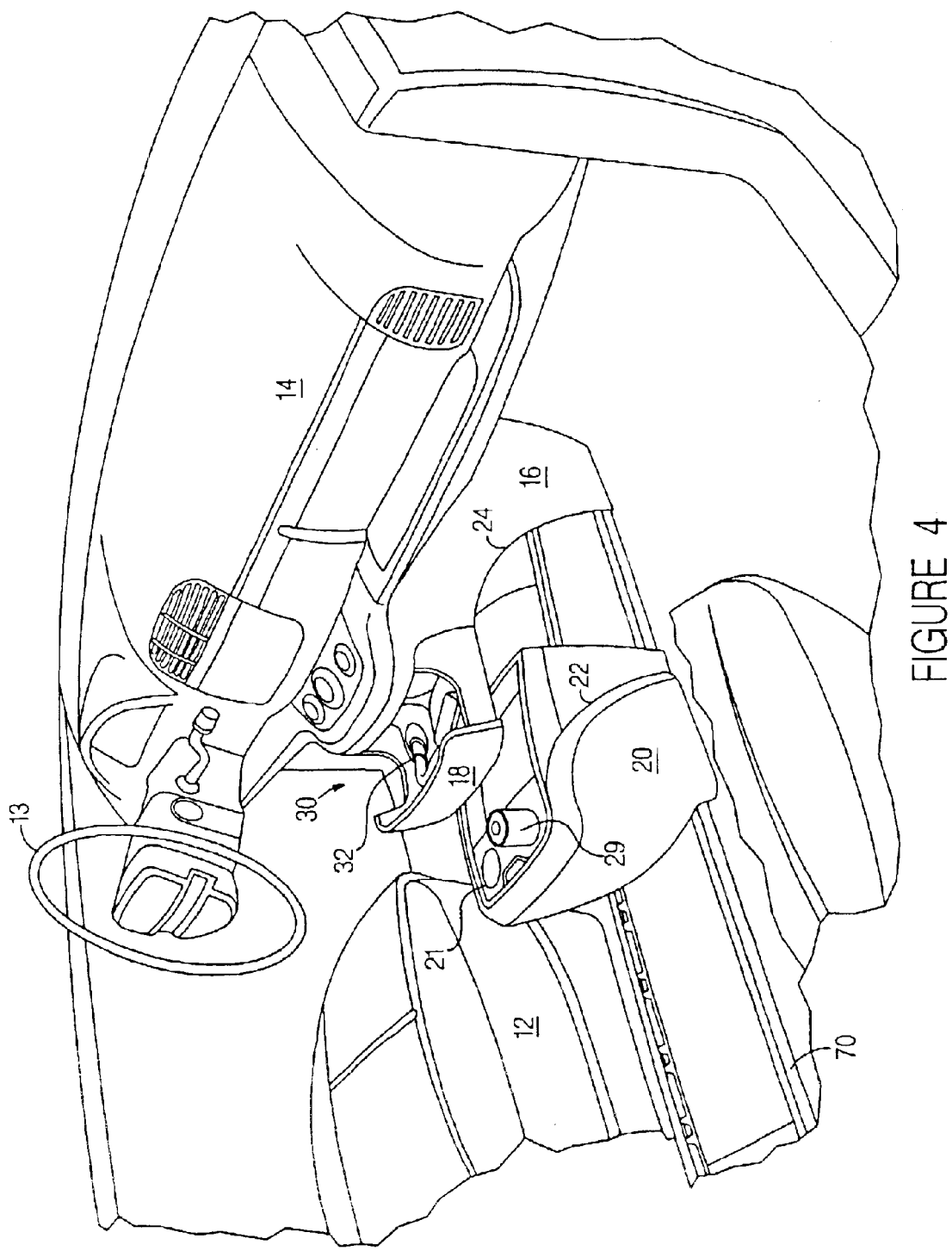
FIG. 4 is a perspective view similar to that of the above-referenced FIGURES and showing the console in a rear location and showing a storage drawer open.
Figure 5:
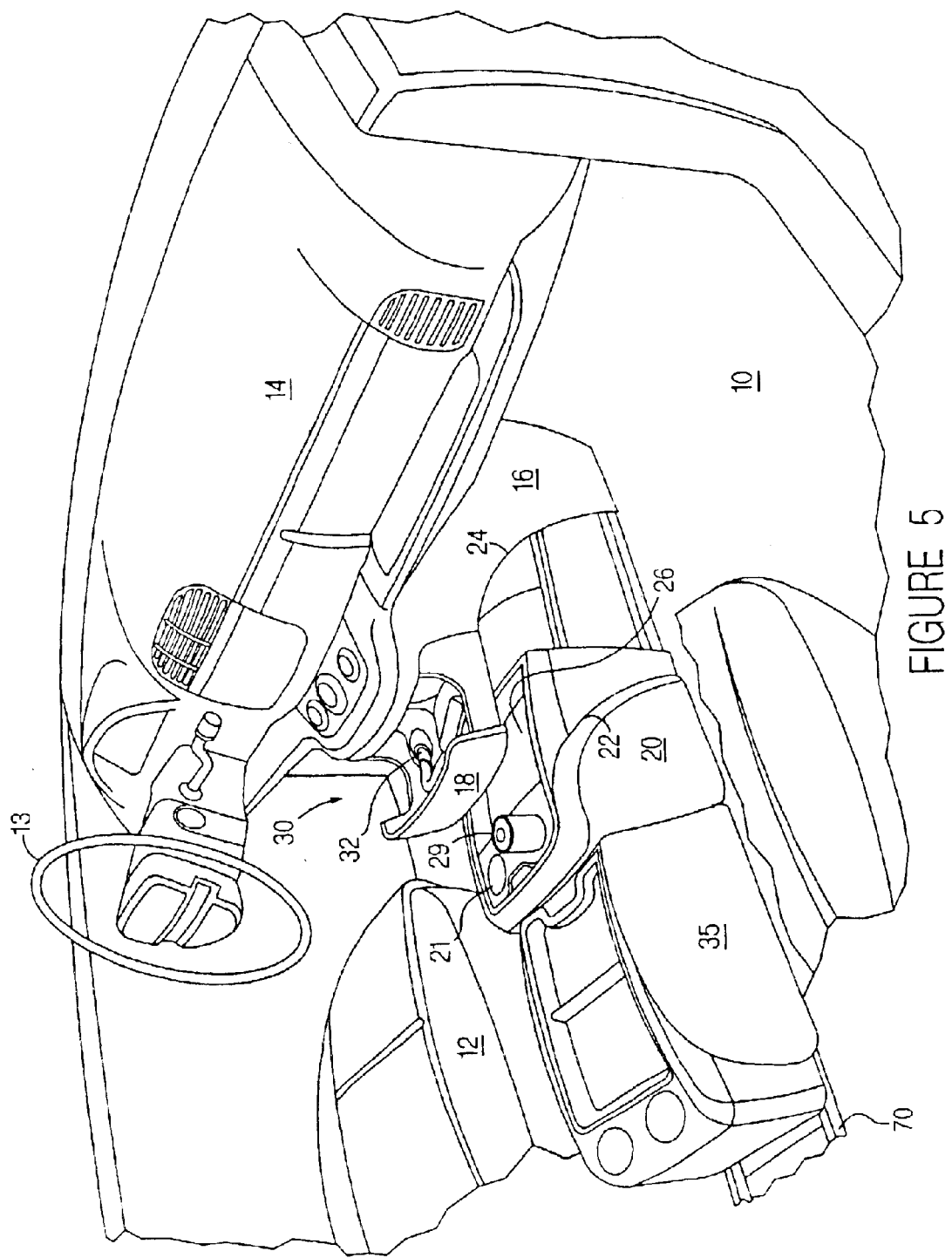
FIG. 5 is another perspective view showing the console in a position spaced apart from the instrument panel and showing a second sliding console disposed to the rear thereof.

In FIG. 4, the console 20 is shown in approximately the same position as in FIG. 3, but a beverage can 29 is placed in one of the holders 21. Moreover drawer 18 is opened to expose an inner cavity 30 which may contain, for example, beverage holders or electric plug receptacles 32. It is desirable, but not critical to the invention, that drawer 18 also have a depth sufficient to allow cups or cans, similar to those shown earlier at 27 and 29 to be held in receptacles (not shown) at the forward portion of cavity 30. Proceeding next to a description of FIG. 5, the console 20 is again shown in the same position as in FIGS. 3 and 4, but a separate console 35 is also shown disposed on track 70. The forward edge of console 35 adjoins the rear edge of console 20 in this embodiment, but nesting or mating is not a requirement of the present invention. The mechanism for movement of console 35 (if it is to move a all) is preferably the same type of mechanism employed for movement of console 20 which will be described shortly hereinafter. Again, console 35 may be located rearwardly between the front and second row of seats, between second row seats, or be even further back in the vehicle depending on the vehicle type and the functionality desired for this console.

One illustrated track mechanism is shown in FIGS. 6–8. Track 70 is shown in FIG. 6 to include left and right, C-shaped track elements 71 and 72, respectively, spaced apart and parallel to one another by stringers 73. The stringers 73 may be attached to the track elements 71, 72 by welding or using any other type of suitable fastening technique. A plurality of slots 75 are present in track element 71 and are arranged to receive the end of a lock assembly mounted to console 20.

The lock assembly according to the preferred embodiment of the present invention is shown in FIG. 7. Lock assembly 80 includes a pair of parallel plates 82 stamped therefrom, an angled portion 81 adapted to be positioned above track element 71, and a lower portion 83 including a bottom 84. The arrangement of elements 81, 83 and 84 is such that the bottom 84 fits within the track element 71 and slides therealong. Anti-friction components may be added, such as wheels, bearings, and the like, as is generally well known in the seat track art. A lock pull assembly 85 is rotatably coupled to lock assembly 80 through a pair of plate portions 86. They are coupled to plates 82 of bracket 89 using a pin 87. The pin 87 includes a head 88 on either end. The pull assembly 85 rotates about the axis of pin 87 and is biased to an inward or locking position by a spring 90. One end of the spring 90 extends through an aperture 91 near the top of lock assembly 80, and the other end of the spring 90, after being wound around pin 87, rests against a lower portion of pull assembly 85. In this connection, reference should be made to FIG. 8, a sectional view of these components. Pull assembly 85 includes a grip 92. By lifting upwardly on grip 92, a locking plate 94 is pulled outwardly (to the left as shown in FIG. 8) pulling the end 95 thereof from within one of the slots 75 of track 70. The console is thereafter moved to a desired location, and at the new position the grip 92 is released to allow end 95 of the pull assembly 85 to enter a different slot 75.

As mentioned early in this specification, the particular construction of the latch mechanism is not to be viewed as limiting with regard to other features of the invention. Track mechanisms including teeth, detents, pins, etc. and which are already known for use in manual seat adjusters could be substituted for the disclosed mechanism simply by configuring the track appropriately and placing a release mechanism on the console to allow it to be moved along the track. The latch and locking mechanism should be sufficiently robust to prohibit separation of the console from the track during a sudden braking or an impact event.

While the present invention has been described in connection with a particularly preferred embodiment thereof, the invention is not to be limited by the drawings. The invention is to be limited solely by the scope of the claims which follow.

What is claimed is:

1. A sliding console system for a vehicle having a cockpit and an instrument panel and a floor, the console system comprising:
    a track located on the floor of the vehicle,
    a console mounted on the track, and
    a lock assembly configured to secure the console relative to the track in a plurality of positions along the track,
    wherein at least a portion of the console nests with at least a portion of the instrument panel when the console is in at least one of the plurality of positions.

2. The sliding console system of claim 1, wherein the track is oriented generally perpendicularly with respect to the instrument panel and the instrument panel is located in a forward part of the cockpit.

3. The sliding console system of claim 2, wherein the at least one of the positions is the most forward position and wherein the nesting occurs when the console is in the most forward position.

4. The sliding console system of claim 1, wherein at least a portion of the console nests below at least a portion of the instrument panel when the console is in at least one of the plurality of positions.

5. The sliding console system of claim 4, wherein at least a substantial portion of the console is nested below the instrument panel.

6. The sliding console system of claim 1, wherein a drawer is provided in the instrument panel which may be opened or closed regardless of the position of the console.

7. The sliding console of claim 1, wherein the console includes at least one component selected from the group consisting of a cup holder, a tray, an electrical port, a hinged lid, an armrest, a storage compartment, an electrical control, a shift lever, a brake lever, an infotainment component, or a latch.

8. The sliding console system of claim 1, wherein at least two consoles are mounted on the track.

9. The sliding console system of claim 1, wherein the instrument panel comprises a concave surface with at least a portion of the concave surface located below another portion of the concave surface and wherein the console comprises a convex surface configured to nest with the concave surface of the instrument panel.

10. The sliding console system of claim 1, wherein nesting console touches and mates with the instrument panel.

11. The sliding console system of claim 10, wherein at least a substantial portion of the console is nested below the instrument panel.

12. The sliding console of claim 1 wherein the console is at least partially received by the instrument panel.

13. The sliding console of claim 1 wherein the console is at least partially inserted into the instrument panel.

14. The sliding console of claim 1 wherein the console is at least partially mated with the instrument panel.

15. The sliding console of claim 1 wherein the console is at least partially engages the instrument panel.

16. The sliding console of claim 1 wherein the console comprises an arcuate portion that nests with an arcuate portion on the instrument panel.

17. A vehicle comprising:
    an instrument panel extending across the front of an occupant cockpit and in front of a pair of spaced apart front seats,
    a track extending between the front seats and fore of the front seats,
    a console engaging the track and movable thereon between a forward position and at least one rearward position,
    wherein at least a substantial portion of the console nests below at least a portion of the instrument panel when the console is in the forward position.

18. The vehicle of claim 17, wherein the track includes a plurality of positioning slots and the console includes a component adapted to selectively engage the positioning slots, whereby the console may be locked in a plurality of positions corresponding to the positioning slots between the forward and the rearward positions.

19. The vehicle of claim 17, wherein the rearward position is located between the front seats.

20. The vehicle of claim 17, wherein the rearward position is located aft of the front seats.

21. The vehicle of claim 17, wherein the console includes at least one component selected from the group consisting of a cup holder, a tray, an electrical port, a hinged lid, an armrest, a storage compartment, an electrical control, a shift lever, a brake lever, an infotainment component, or a latch.

22. The vehicle of claim 17, wherein at least two consoles are mounted on the track.

23. The vehicle of claim 17, wherein a drawer is provided in the instrument panel which may be opened or closed regardless of the position of the console.

24. The sliding console system of claim 17, wherein the track is located on the floor of the vehicle.

25. The vehicle of claim 17 wherein the instrument panel comprises an arcuate portion and the console comprises and arcuate portion configured to nest with the arcuate portion of the instrument panel.

26. The vehicle of claim 25 wherein the arcuate portion of the instrument panel is concave and the arcuate portion of the console is convex.

27. The vehicle of claim 17 wherein the instrument panel comprises a lower portion that extends toward the floor.

28. The vehicle of claim 27 wherein at least a portion of the console is received by the lower portion of the instrument panel.

29. The vehicle of claim 27 wherein at least a portion of the console is inserted into the lower portion of the instrument panel.

30. The vehicle of claim 27 wherein at least a portion of the console is mated with the lower portion of the instrument panel.

31. The vehicle of claim 27 wherein at least a portion of the console engages with the lower portion of the instrument panel.

32. A sliding console system for a vehicle having a cockpit and an instrument panel, the console system comprising:

a track;

a console slidably mounted on the track; and means for locking the console to the track in at least a first position and a second position;

wherein at least a portion of the console nests below at least a portion of the instrument panel when the console is in the first position.

33. The sliding console of claim 32, wherein the means for locking the console comprises a plurality of slots in the track and an operator for selectively inserting and removing a locking plate into a selected one of the slots.

34. The sliding console system of claim 32, wherein the means for locking the console to the track comprises a lock assembly and lock pull assembly rotatably coupled to the lock assembly and including a grip and a locking plate, wherein upward lifting of grip is configured to remove the locking plate from a slot in the track.

* * * * *